(12) United States Patent
Dudar et al.

(10) Patent No.: US 12,094,265 B2
(45) Date of Patent: Sep. 17, 2024

(54) SYSTEM AND METHOD FOR MONITORING TIRES OF A VEHICLE

(71) Applicant: Ford Global Technologies, LLC, Dearborn, MI (US)

(72) Inventors: Aed M. Dudar, Canton, MI (US); Mahmoud Yousef Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 213 days.

(21) Appl. No.: 17/936,163

(22) Filed: Sep. 28, 2022

(65) Prior Publication Data

US 2024/0104974 A1 Mar. 28, 2024

(51) Int. Cl.
*G07C 5/08* (2006.01)
*B60S 1/68* (2006.01)
*G01M 17/02* (2006.01)

(52) U.S. Cl.
CPC .......... *G07C 5/0808* (2013.01); *G01M 17/02* (2013.01); *G07C 5/0825* (2013.01); *B60S 1/68* (2013.01)

(58) Field of Classification Search
CPC ... G07C 5/0808; G07C 5/0825; G01M 17/02; B60S 1/68
See application file for complete search history.

(56) References Cited

U.S. PATENT DOCUMENTS

| | | | |
|---|---|---|---|
| 6,998,974 B2 | 2/2006 | Bergerhoff | |
| 11,428,606 B2* | 8/2022 | Kain Venkatadri | G07C 5/0808 |
| 2015/0034222 A1 | 2/2015 | Martin et al. | |
| 2018/0201075 A1* | 7/2018 | Alexander | G07C 5/0808 |
| 2020/0094624 A1 | 3/2020 | Huang et al. | |

OTHER PUBLICATIONS

Trident Solid Tire Performance Monitoring System, Indiamart, 1-7.

* cited by examiner

*Primary Examiner* — Behrang Badii
*Assistant Examiner* — Jay Khandpur
(74) *Attorney, Agent, or Firm* — Frank Lollo; Eversheds Sutherland (US) LLP (57) ABSTRACT

A method performed by an electronic control unit of a vehicle, to monitor tires of the vehicle. The method includes evaluating a target location to monitor the vehicle tires. Based on the evaluation that the target location is fit to monitor the tires, the method includes initiating a monitoring mode of the vehicle. In response to initiating the monitoring mode, the method includes rotating front tires and back tires of the vehicle in opposite directions. During the rotation of the front and back tires, the method includes monitoring the rotation of the tires by using one or more vehicle sensors. The method further includes determining one or more anomalies in the vehicle tires based on the monitoring of the rotation of the front and back tires. Based on the determination, the method includes performing one or more remedial actions to mitigate the anomalies.

20 Claims, 4 Drawing Sheets

SYSTEM AND METHOD FOR MONITORING TIRES OF A VEHICLE

TECHNICAL FIELD

The present disclosure relates to a system and method for monitoring tires of a vehicle, and more particularly, to monitoring tire condition.

BACKGROUND

Conventional vehicles use pneumatic tires that support air pressure. Operators of the conventional vehicles regularly monitor the condition of the tires and re-fill the air to ensure longevity of the tires. Most modern vehicles have in-built tire-pressure monitoring systems (TPMSs) to assist the operators in monitoring the tire condition. Specifically, a TPMS uses tire sensors to measure air pressure of the tires. The TPMS issues an alert to the vehicle operator when it senses low air pressure or an air leakage in the tires.

While the TPMS is efficient in monitoring the condition of pneumatic tires, it has limited applicability in monitoring the condition of non-pneumatic tires (the tires that do not support air pressure). The non-pneumatic tires, like their pneumatic counterparts, require regular monitoring to ensure longevity of operation. Examples of wear and tear issues of non-pneumatic tires include loss of rigid tire structure over time, deterioration of rubber spokes, presence of contaminants in rubber spokes, imbalance in the tires, and the like.

Since the non-pneumatic tires do not support air pressure, the conventional TPMS fails to monitor the condition of the non-pneumatic tires. Thus, there exists a need in the industry for a system and method to monitor the condition of non-pneumatic tires.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure describes a tire monitoring system for monitoring condition of vehicle tires. In some aspects, the system may cause front vehicle tires to rotate in one direction (for example, a clockwise direction) and back vehicle tires to rotate in the opposite direction (for example, a counterclockwise direction), at a same speed. Upon rotation of the tires, one or more sensors of the system may measure the rotational speed of each tire and may output corresponding speed signals. The system may monitor the condition of each tire by identifying anomalies in the speed signals. In some aspects, an anomaly in a speed signal for a tire may indicate an issue or fault in the tire (also collectively referred to herein as an anomaly). Responsive to identification of an anomaly in the speed signal, the system may perform one or more remedial actions to fix the corresponding faulty tire or modify drive parameters such as top speed, travel distance, maximum load weight, maximum towing capacity, etc. based on the fault or issue with the tire. Also, the term tire used herein may include, but is not limited to, any individual element or combination of the rubber, metal rim, the entire wheel, and any elements on them.

In some aspects, the vehicle tires may be non-pneumatic tires, and the one or more sensors may include anti-lock braking system (ABS) sensors.

In some aspects, the system may include four independent motors coupled to each of the four vehicle tires. Each motor may rotate the corresponding vehicle tire, independent of the rotation of the other vehicle tires. Furthermore, the motors may rotate the front vehicle tires in one direction and the back vehicle tires in the opposite direction at the same speed, to ensure that the vehicle remains stationary, for instance, as the vehicle performs a zero radius turn.

In some aspects, responsive to a determination of a fault or performance issue with the tires, the system may perform remedial actions that may include removing contaminants from the tires by blowing pressurized air, recommending reduction in speed, travel distance, maximum towing capacity, and/or weight of the vehicle, and the like.

The present disclosure provides the system for monitoring condition of vehicle tires, especially non-pneumatic vehicle tires. The system can monitor the condition of the vehicle tires without causing any movement of the vehicle. Thus, the present disclosure provides an advantage that the tire conditions can be monitored in places with limited space (for example, parking lots, urban areas, etc.). Further, the system uses existing units and sensors of the vehicle, and thus does not require expensive external sensors or manual intervention (for example, from vehicle mechanics) to monitor the tire condition.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 1:
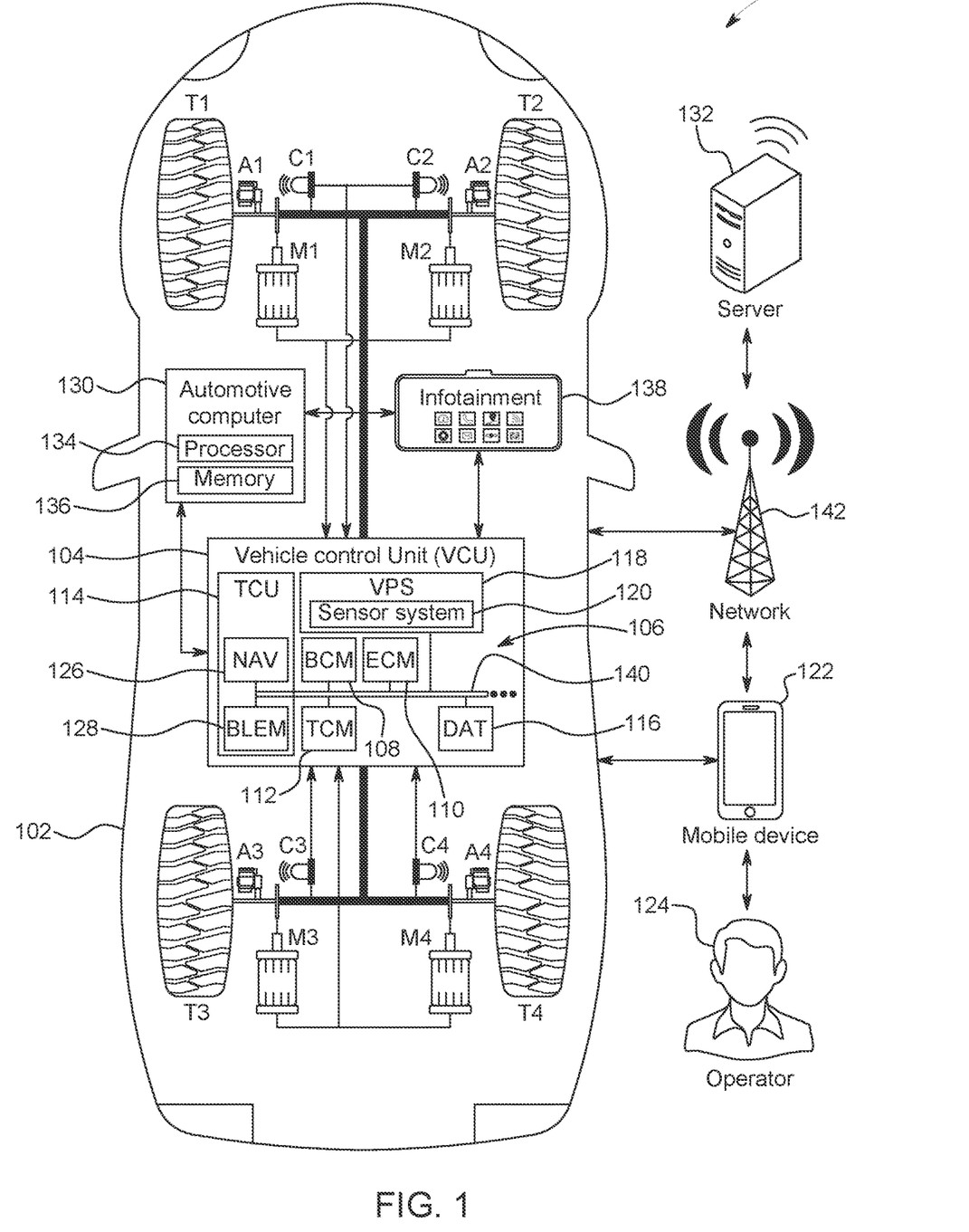
FIG. 1 depicts an example environment in which techniques and structures for providing the systems and methods disclosed herein may be implemented.

FIG. 1 depicts an example environment 100 in which techniques and structures for providing the systems and methods disclosed herein may be implemented. More particularly, FIG. 1 depicts an example environment 100 that may include a vehicle 102. The vehicle 102 may take the form of any passenger or commercial vehicle such as, for example, a car, a work vehicle, a crossover vehicle, a van, a minivan, a taxi, a bus, etc. Further, the vehicle 102 may be a manually driven vehicle, and/or be configured to operate in a fully autonomous (e.g., driverless) mode and/or partially autonomous mode, and may include any powertrain such as, for example, a gasoline engine, one or more electrically-actuated motor(s), a hybrid system, etc.

The vehicle 102 may include four tires T1, T2, T3, T4, where T1 may be the front left tire, T2 may be the front right tire, T3 may be the back left tire, and T4 may be the back right tire. In some aspects, the tires T1-T4 may be non-pneumatic tires. Alternatively, the tires T1-T4 may be pneumatic tires.

In accordance with some aspects of the present disclosure, the vehicle 102 may include one or more sensors mounted in or on, affixed to, embedded in, or otherwise coupled to the tires T1-T4. For instance, the vehicle 102 may include an anti-lock braking system (ABS) sensor mounted near the tires (e.g., T1 may have an ABS sensor A1, T2 may have ABS sensor A2, T3 may have ABS sensor A3, and T4 may have ABS sensor A4). The ABS may include speed sensors that monitor the speed of rotation of the tires T1-T4.

An ABS sensor typically includes a permanent magnet, and a Hall effect sensor positioned next to the permanent magnet. The magnetic field around the permanent magnet changes when a metallic object passes through the magnetic field of the magnet. The change in the magnetic field causes a change in the output of the Hall effect sensor. The vehicle ABS sensor uses this phenomenon to monitor the speed of rotation of the tires T1-T4. Specifically, the tire includes a metallic tooth or teeth (that are part of the tire/rim assembly) pass through the magnetic field of the permanent magnet of the ABS sensor when the tires T1-T4 rotate. This causes a change in the magnetic field around the permanent magnet, and the Hall effect sensor captures the change in the magnetic field. Upon sensing the change, the Hall effect sensor outputs signals, for instance a square wave pulse, indicating the magnitude of the change in the magnetic field. The frequency of the signals indicates the rotational speed of the tires and the number of the tire teeth.

In some aspects, the vehicle 102 may include additional sensors that may be mounted proximate to but not in or on the tires T1-T4. For instance, the sensors may be positioned on the rim, axle, vehicle body or any other suitable place in the vehicle 102. Examples of such sensors include, but are not limited to, accelerometers or vibration sensors (not shown in FIG. 1) mounted on the vehicle axles and/or suspension components to monitor the vibration of the axles or suspension components, vehicle cameras C1, C2, C3, C4 mounted proximate to the tires T1-T4 to monitor the tire condition or the surroundings of the vehicle 102, and/or the like.

In accordance with one or more aspects of the present disclosure, each tire (T1-T4) may be connected to a motor. In other words, the vehicle 102 may include four motors M1, M2, M3, and M4 that connect to each of the tires T1-T4, respectively. The four motors M1-M4 may work independently of each other, to rotate/drive the tires T1-T4 in a predetermined direction. In accordance with other aspects, the vehicle 102 may have two motors. In this case, one motor may rotate the front tires T1, T2, and the second motor may rotate the back tires T3, T4.

In some aspects, the vehicle 102 may include a Vehicle Control Unit (VCU) 104 that may include a plurality of electronic control units (ECUs) 106, and a Vehicle Perception System (VPS) 118 having connectivity with and/or control of one or more vehicle sensory system(s) 120.

The ECUs 106 may communicatively couple with the one or more vehicle sensors and the motors M1-M4. In other words, the VCU 104 may have connectivity with and/or control the one or more vehicle sensors (e.g., the ABS sensors A1-A4, the cameras C1-C4, the vibration sensors, etc.), and the motors M1-M4.

In some aspects, the ECUs 106 may include one or more modules/units, such as, a Body Control Module (BCM) 108, an Engine Control Module (ECM) 110, a Transmission Control Module (TCM) 112, a Telematics Control Unit (TCU) 114, a Driver Assistances Technologies (DAT) controller 116, and the like. In some aspects, the ECUs 106 may control one or more vehicle operations using these units and by receiving inputs from human drivers, an autonomous vehicle controller, and/or via wireless signal inputs received via wireless connection from other connected devices, such as a mobile device 122 (having a user interface) associated with a vehicle operator 124, among others.

In one or more aspects, the BCM 108 may include integration of the one or more vehicle sensors, vehicle performance indicators, and variable reactors associated with vehicle systems. In addition, the BCM 108 may include processor-based power distribution circuitry that can control functions associated with the vehicle 102 body, such as the tires T1-T4, lights, windows, security, door locks, access control, and various comfort controls. The BCM 108 may also operate as a gateway for bus and network interfaces to interact with remote ECUs (not shown in FIG. 1).

In some aspects, the DAT controller 116 may provide Level-1 through Level-3 automated driving and driver assistance functionality that can include, for example, tire monitoring assistance, tire cleaning assistance, active parking assistance, trailer backup assistance, adaptive cruise control, lane keeping, and/or driver status monitoring, among other features. The DAT controller 116 can obtain input information via the one or more vehicle sensory system(s) 120, which may include sensors disposed on the vehicle interior and/or exterior (such as seat sensors and/or weather sensors, not shown in FIG. 1). In particular, the DAT controller 116 may receive sensor information associated with tire conditions, occupancy of the vehicle 102, target position/location to perform testing/monitoring of the tires, driver functions, vehicle functions, environmental inputs, and other similar information, from the one or more vehicle sensors.

In some aspects, the TCU 114 may be configured and/or programmed to provide vehicle connectivity to wireless computing systems onboard and off board the vehicle 102. The TCU 114 may include a Navigation (NAV) receiver 126 for receiving and processing a GPS signal from GPS (not shown in FIG. 1), a BLE® Module (BLEM) 128, a Wi-Fi transceiver, a UWB transceiver, and/or other wireless transceivers (not shown in FIG. 1) that may be configurable for wireless communication between the vehicle 102 and other systems, computers, and modules. The TCU 114 may be disposed in communication with the ECUs 106 by way of a bus 140.

In some aspects, the vehicle 102 may include an automotive computer 130 that may be installed in an engine compartment of the vehicle 102 (or elsewhere in the vehicle 102). In particular, the automotive computer 130 may be disposed in communication with the VCU 104, the mobile device 122, and one or more server(s) 132. In particular, the automotive computer 130 may share a wired or wireless communication bus with the VCU 104, and may be configured and/or programmed to exchange the vehicle data with the VCU 104.

In one or more aspects, the automotive computer 130 may communicate with the server(s) 132 that may be part of a cloud-based computing infrastructure. In particular, the servers(s) 132 may be associated with and/or include a Telematics Service Delivery Network (SDN) that provides digital data services to the vehicle 102 and other vehicles (not shown in FIG. 1) that may be part of a vehicle fleet.

In some aspects, the automotive computer 130 may use wired and/or wireless communication protocols and transceivers to connect with the mobile device 122 associated with the vehicle operator 124. Specifically, the mobile device 122 may communicatively couple with the automotive computer 130 via one or more network(s) 142. The network(s) 142 illustrate an example communication infrastructure in which the connected devices discussed in various embodiments of this disclosure may communicate.

The network(s) 142 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

In some aspects, the automotive computer 130 may be or include an electronic vehicle controller, having one or more processors 134 and a memory 136. The one or more processors 134 may be disposed in communication with one or more memory devices disposed in communication with the respective computing systems (e.g., the memory 136 and/or one or more external databases not shown in FIG. 1). The one or more processors 134 may utilize the memory 136 to store programs in code and/or to store data for performing aspects in accordance with the disclosure.

The memory 136 may be a non-transitory computer-readable memory storing a code for monitoring vehicle tire condition. The memory 136 may include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In some aspects, the VCU 104 may control operational aspects of the vehicle 102 by using one or more instruction sets stored in the memory 136 of the automotive computer 130.

In some aspects, the automotive computer 130 may connect with a vehicle infotainment system 138 that may provide an interface for the navigation and GPS receiver. The vehicle infotainment system 138 may include a touchscreen interface portion (e.g., a user interface), and may include voice recognition features, biometric identification capabilities that can identify users based on facial recognition, voice recognition, fingerprint identification, or other biological identification means. In other aspects, the vehicle infotainment system 138 may provide user identification using mobile device pairing techniques (e.g., connecting with the mobile device 122, a Personal Identification Number (PIN) code, a password, pas sphrase, or other identifying means. In additional aspects, the vehicle infotainment system 138 may display messages or notifications on the touchscreen interface.

FIGS. 2A-2D depict an example embodiment to monitor condition of tires T1, T2, T3, and T4 of a vehicle 200 (same as the vehicle 102), in accordance with the present disclosure. While describing FIGS. 2A-2D, references will be made to FIG. 1 and FIGS. 3A-3C.

As discussed above, the tires T1-T4 may connect with the four independent motors M1-M4. For instance, the front left motor M1 may connect with the front left tire T1, the front right motor M2 may connect with the front right tire T2, the back left motor M3 may connect with the back left tire T3, and the back right motor M4 may connect with the back right tire T4.

In some aspects, the four motors M1-M4 may work independently of each other, to rotate/drive the tires T1-T4 in a predetermined direction and at a predetermined speed.

In one aspect, to monitor condition of the tires T1-T4, the ECUs 106 (not shown in FIGS. 2A-2D) may actuate the front left and right motors M1 and M2 to rotate the front left and right tires T1 and T2 in one direction, for example, a clockwise direction. Similarly, the ECUs 106 may actuate the back left and right motors M3 and M4 to rotate the back left and right tires T3 and T4 in an opposite direction, for example, an anti-clockwise direction. In addition, the ECUs 106 may actuate all the motors M1-M4 in such a manner that all the tires T1-T4 rotate at a same speed.

A person ordinarily skilled in the art may appreciate that the vehicle 200 remains stationary when the tires rotate at the same speed, and the front tires rotate in one direction and the back tires rotate in the opposite direction. In other words, to monitor the condition of the tires T1-T4, the ECUs 106 may cause rotation of the tires T1-T4 in such a manner that the vehicle 200 does not move forward or backward, but may result in a zero radius turn. Thus, the ECUs 106 may monitor the condition of the tires T1-T4 at a location where space is limited, for example, in a parking lot, an urban area with limited vehicle space, and/or the like.

Figure 2:
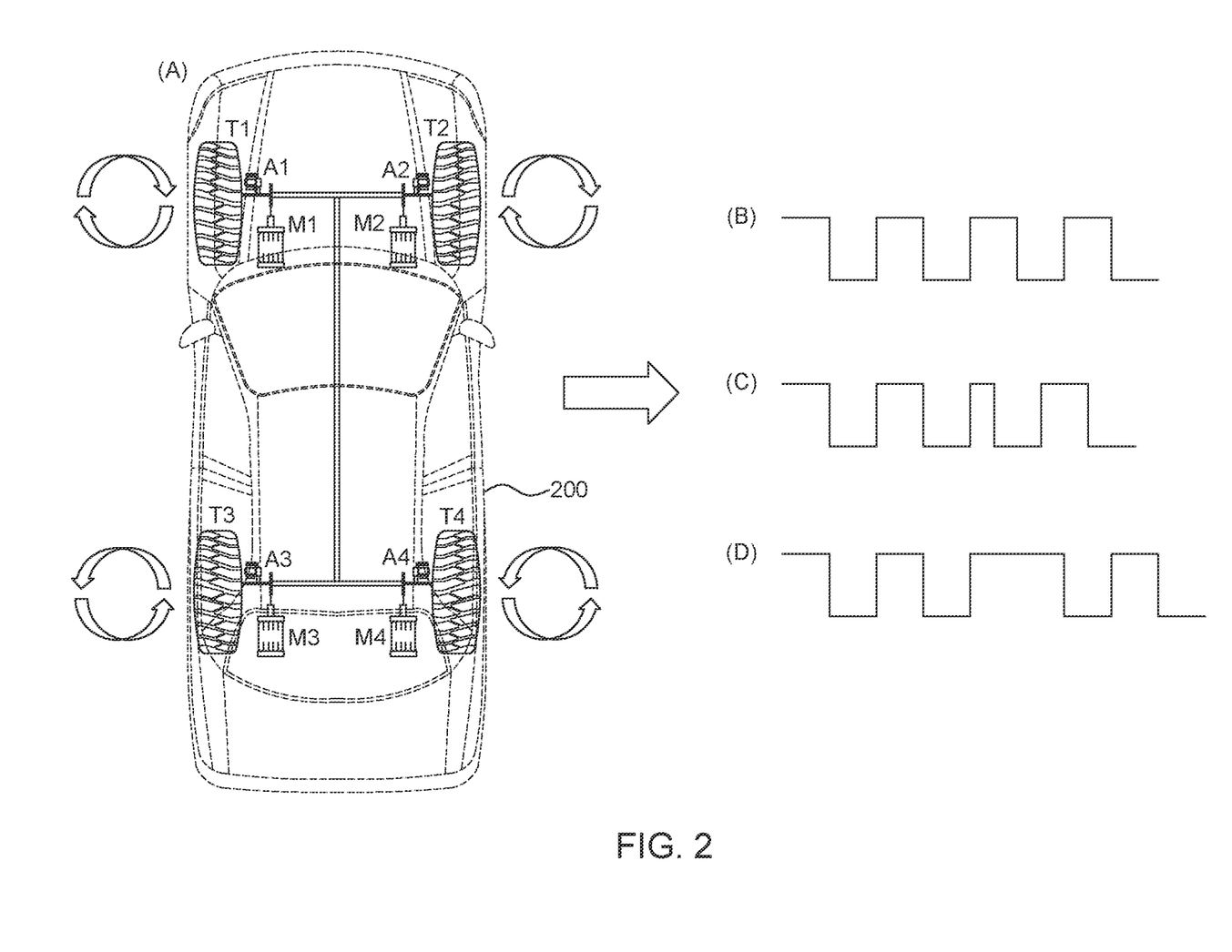
FIGS. 2A-2D depict an example embodiment to monitor condition of tires in a vehicle, in accordance with the present disclosure.

In some aspects, the one or more sensors installed in the vehicle 200 may monitor the movement/rotation of the tires T1-T4, when the tires T1-T4 rotate in the manner described above. Examples of the one or more sensors may include, but are not limited to, ABS sensors A1-A4 (as shown in FIG. 2A), and other sensors such as vibration sensors, cameras, inertial sensors, microphone, and temperature sensors (not shown in FIGS. 2A-2D).

For instance, the ABS sensors A1-A4 (arranged near the tires T1-T4) may monitor the speed of rotation of the respective tires T1-T4, and generate/output speed signals corresponding to the speed of the tire rotation. As an example, the ABS sensors A1-A4 may output "square waves" as speed signals when the tires T1-T4 rotate, and the frequency of the square waves may be proportional to the speed of the tire rotation. In some aspects, each ABS sensor (A1, A2, A3, and A4) may output an independent speed signal, corresponding to the speed of rotation of the associated tire. For example, A1 may output a speed signal corresponding to the speed of rotation of the tire T1, A2 for T2, and so on.

In one or more aspects of the present disclosure, the ABS sensors A1-A4 may transmit the speed signals to the ECUs 106 to evaluate the condition of the tires T1-T4. In particular, the ECUs 106 may compare the speed signals transmitted by the ABS sensors A1-A4 with a predefined speed signal, and determine an anomaly in the tires T1-T4. For instance, an ABS sensor may output a perfect square wave as a speed signal, as illustrated in FIG. 2B, when the corresponding tire rotates on a flat/smooth surface, and the condition of the tire is good. However, the ABS sensor may output an imperfect square wave, as illustrated in FIGS. 2C and 2D when the rotational speed of the tire is inconsistent due to an issue or fault with the corresponding tires. Specifically, FIGS. 2C and 2D may indicate square waves corresponding to a faulty tire, which may be due to wobble in the tire, missing or broken spoke in the tire, and/or presence of contaminant in the tire, such as debris embedded in the structure of a non-pneumatic tire. In other words, a perfect square wave output from an ABS sensor may indicate a healthy tire, and an imperfect square wave may indicate a faulty tire.

In some aspects, the predefined speed signal may be, for example, a perfect square wave signal. Based on the comparison of the received speed signals with the perfect square wave signal, the ECUs 106 may evaluate the condition of the tires T1-T4. Specifically, if a speed signal corresponding to a tire (for example, the tire T2) deviates from the perfect square wave signal, the ECUs 106 may determine that the tire T2 may be faulty or have a performance issue.

A person ordinarily skilled in the art may appreciate the tires T1-T4 rotate on a flat and smooth surface to ensure accurate output of the speed signals from the ABS sensors A1-A4. This is because the speed signals may distort due to external factors, if the tires rotate on an uneven or non-smooth surface.

In some aspects, the ECUs 106 may receive signals from other vehicle sensors, in addition to the ABS sensors A1-A4. For example, the ECUs 106 may receive signals from the vibration sensors, the cameras, the inertial sensors, microphone, temperature sensors, and/or the like.

For instance, if the vehicle vibration sensors detect a vibration in the tires, suspension component and/or axles that is greater than a predefined threshold, the vibration sensors may then send the corresponding vibration signal to the ECUs 106. On receipt of the signal, the ECUs 106 may detect a fault or an anomaly in the tires T1-T4. Similarly, if the microphone detects a sound having a decibel level greater than a particular threshold or persistent for more than a threshold amount of time, the microphone may send the corresponding sound signal to the ECUs 106. In this case, the ECUs 106 may filter the noise from outside and other components from the received sound signal and may detect a fault in the tires T1-T4 if the decibel level in the filtered signal is above a predefined sound threshold and/or persistent for more than a threshold of time. The filtered sound signal may also be compared to sample recordings of know issues to determine if there is a match, indicating there may be an issue or fault, and based on the position of the microphone which tire is impacted. Similarly, analysis of the image data capture by a camera can reveal a vibration in a tire that, if exceeding a threshold level of vibration, may be indicative of a fault of performance issue. The image data may also be used to determine the location of debris or broken or torn rubber spokes of a non-pneumatic tire. The location of the camera may also be used to determine the tire with the fault or performance issue.

Upon receiving the signals from the vehicle sensors mentioned above, the ECUs 106 may fuse or combine the signals (from the ABS sensors and the other vehicle sensors) to evaluate and determine the condition of the tires T1-T4 in a precise manner. For example, if the ABS signal, the camera signal, and the vibration signal corresponding to the tire T2 indicate an anomaly, the ECUs 106 may determine that the tire T2 is faulty.

In some aspects, upon determining that one of the tires T1-T4 is faulty or has a performance issue, the ECUs 106 may perform one or more remedial actions to mitigate the anomalies in the faulty tire(s). The details of the remedial actions may be understood in conjunction with FIGS. 3A-3C described below.

Figure 3:
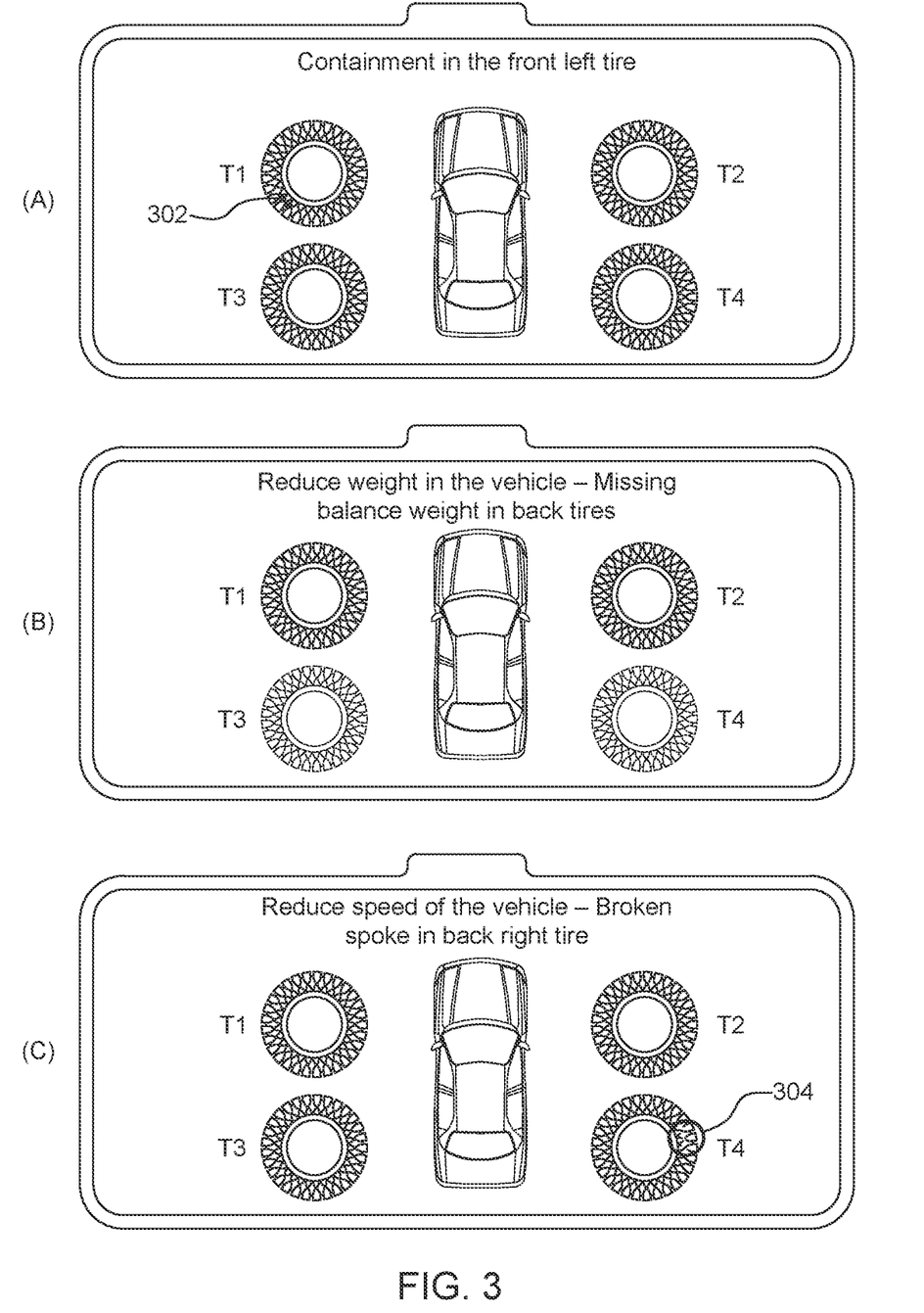
FIGS. 3A-3C depict a representation of an output of a tire monitoring system, in accordance with the present disclosure.

In accordance with one aspect, upon detecting the anomalies, the ECUs 106 may transmit an information associated with the detected anomalies to the vehicle operator 124. In some aspects, the ECUs 106 may transmit the information, for example, via the mobile device 122 (or any other user device) or via the vehicle infotainment system 138. For instance, FIGS. 3A-3C depict an example output of the tire monitoring operation that is displayed on the mobile device 122 or the vehicle infotainment system 138. In particular, the ECUs 106 may display, via the vehicle infotainment system 138 (or the mobile device 122), the condition of each of the tires T1-T4, as shown in FIG. 3A, when the ECUs 106 perform the testing operation.

For instance, FIG. 3A shows conditions of all the tires T1-T4 on the vehicle infotainment system 138. In FIG. 3A, the vehicle infotainment system 138 shows a contaminant 302 (such as lodging of rocks in open spaces of non-pneumatic tires) in the front left tire T1. In addition, the vehicle infotainment system 138 may also indicate the type and exact location of the contaminant in the tire T1 (as determined by the vehicle camera sensors). Further, the ECUs 106, via the vehicle infotainment system 138, may provide recommendation to remove the contaminant. Based on the recommendation, the vehicle operator 124 may either remove the contaminant manually or may trigger cleaning of the contaminant.

In some aspects, on-board vehicle compressors (not shown) may perform the cleaning of the tire T1 (or any other tire). Specifically, the on-board compressors may pass pressurized air through the open spaces of the tire T1 to remove the contaminant. In some aspects, the pressure and time duration for passing of the pressurized air may be based on the type and the size of the contaminant present in the tires.

In some aspects, the ECUs 106 may automatically initiate the cleaning of the tires T1-T4, via the onboard compressors, based on the detection of the contaminant in the tires T1-T4. In one or more aspects, the ECUs 106 may trigger the cleaning operation of the tires T1-T4 based on an evaluation of the location where the vehicle 200 is parked. For instance, the ECUs 106 may determine (by using the vehicle cameras C1-C4) whether the vehicle 200 is parked in a crowded location. Based on a determination that the vehicle 200 is parked in a crowded location, the ECUs 106 may disable (or not initiate) the cleaning operation as the contaminant (like stones) may hurt a nearby person or a vehicle. On the other hand, if the ECUs 106 determine that the vehicle 200 is parked in a non-crowded space, the ECUs 106 may initiate the automatic cleaning of the tires T1-T4.

In some aspects, the ECUs 106 may validate (via the vehicle cameras C1-C4) whether the contaminant is removed when the ECUs 106 complete the cleaning process of the tires T1-T4. In other words, the ECUs 106 may determine whether the contaminant is removed from the contaminated tire using a detection unit (such as using the camera C1-C4). The ECUs 106 may trigger another round of cleaning of the tires T1-T4 by using the on-board compressor, if the ECUs 106 determine that contaminant is not removed. In some aspects, the ECUs 106 may subsequently trigger 3-4 rounds of cleaning process. In case the contaminant still exists, the ECUs 106 may recommend a vehicle service or a vehicle wash to the vehicle operator 124 (by sending a notification to the vehicle infotainment system 138 or the mobile device 122).

In some aspects, the ECUs 106 may determine, via the one or more vehicle sensors that balance weight is missing in the back tires T3, T4. Based on the determination, the ECUs 106 may recommend, via the vehicle infotainment system 138, to reduce weight in the vehicle 200 so that there is relatively less pressure on the tires T3-T4, as shown in FIG. 3B. In one or more aspects, the ECUs 106 may also recommend the total weight the vehicle 200 may carry without further damaging the tires T3-T4 or any other vehicle part. Similarly, the ECUs 106 may recommend reduction in the driving speed of the vehicle 200, driving distance, towing capacity, etc. when the ECUs 106 determine that, for instance, that a rubber spokes 304 of the non-pneumatic tire T4 is broken, as shown in FIG. 3C.

In some aspects, the ECUs 106 may also recommend a travel route (and time) from a current location of the vehicle 200 to a destination location of the vehicle 200, such that the faulty tire(s) does not face further deterioration due to bad road. In particular, the ECUs 106 may request the vehicle NAV 126 to provide the current location and the destination location of the vehicle 200. In some aspects, the ECUs 106 may request the vehicle NAV 126 to provide different routes to travel from the current location to the destination location. Responsive to receiving the current location, the destination location, and the different routes, the ECUs 106 may select a specific route from the different routes that offer smooth roads. For example, the ECUs 106 may select a route having express lanes instead of bumpy roads, so that the vehicle tires do not face pressure. In some aspects, the ECUs 106 may transmit the selected route to the vehicle NAV 126, to display to the vehicle operator 124, via the mobile device 122 or the vehicle infotainment system 138.

In some aspects, responsive to receiving the current location, destination location, and the different routes, the ECUs 106 may also select a route having a tire store/service center to fix the faulty tires. Alternatively, the ECUs 106 may use the current location of the vehicle 200 to determine nearby tires stores/service centers via the vehicle NAV 126 and recommend the tire stores to the vehicle operator 124, via the mobile device 122 or the vehicle infotainment system 138.

In addition to providing recommendations and/or performing remedial actions to fix faulty tires as described above, the ECUs 106 may provide additional recommendations to the vehicle operator 124 and/or perform additional actions.

Specifically, as described above, for accurate measurement of the speed signals from the ABS sensors A1-A4, the tires T1-T4 rotate on a smooth, dry, and flat surface. Further, the tires T1-T4 rotate in a quiet environment with minimal ambient noise, to precisely evaluate the fault in the tires T1-T4 using the sound signals. In accordance with one or more aspects, the ECUs 106 may evaluate and recommend a target location to rotate the tires T1-T4, to monitor the condition of the tires T1-T4 accurately.

For instance, the ECUs 106 may first analyze or evaluate a target position/location to test the condition of the tires T1-T4, by using the vehicle sensors and/or the vehicle cameras. Based on an evaluation that the target position/location is acceptable, the ECUs 106 may initiate the automatic testing of the tires T1-T4 by rotating the tires T1-T4 in the pre-defined directions and speed, as described above. On the other hand, if the ECUs 106 determine that the position/surface on which the vehicle 200 is parked has stones or pebbles (by using the vehicle cameras) or the vehicle 200 is parked in a crowded space, the ECUs 106 may disable (or not initiate) the testing of the tires T1-T4. In some aspects, the ECUs 106 may send, via the mobile device 122 or the vehicle infotainment system 138, a notification to the vehicle operator 124 to move the vehicle 200 to an acceptable space (such flat, non-wet, smooth surface, and non-crowded space). Along with the notification, the ECUs 106 may also send recommendations of locations to the vehicle operator 124. For example, by using the vehicle NAV 126, the ECUs 106 may determine non-crowded locations, and may recommend these locations to the vehicle operator 124 via the mobile device 122 or the vehicle infotainment system 138.

Furthermore, in accordance with one or more aspects, the ECUs 106 may initiate the testing operation (e.g., initiate/trigger the rotation of the tires T1-T4) when the vehicle 200 is in non-occupation mode. In other words, the ECUs 106 may trigger the testing operation when there is no operator inside the vehicle 200. In particular, the ECUs 106 may take inputs from the one or more vehicle sensory system(s) 120 to determine when the operator or passenger is sitting inside the vehicle 200. For instance, the ECUs 106 may take inputs from the vehicle seat sensors to determine whether any person is present inside the vehicle 200. Based on a determination that the vehicle 200 is vacant, the ECUs 106 may automatically trigger the testing operation of the tires T1-T4.

In some aspects, the ECUs 106 may automatically trigger the testing operation of the tires T1-T4 after a predefined time duration. For example, the vehicle operator 124 may set (via the vehicle infotainment system 138 or the mobile device 122) the automatic testing frequency of 7 days. Upon receiving the setting, the memory 136 may store the setting. Thereafter, the one or more processors 134 may obtain the setting from the memory 136 and may trigger the ECUs 106 to perform the automatic testing operation of the tires T1-T4. In the example, the ECUs 106 may receive the trigger every week, and then cause the evaluation of the target location of the vehicle 200. Upon successful evaluation of the target location, the ECUs may cause the rotation of the tires T1-T4 to perform the monitoring of the tires T1-T4.

In some aspects, the ECUs 106 may determine the frequency to perform the testing operation on its own, based on the age and historical condition of the tires T1-T4, which may be stored in the memory 136. In particular, the one or more processors 134 may fetch the age and historical condition of the tires T1-T4 from the memory 136 and may transmit the age and the historical condition to the ECUs 106. Responsive to receiving the age and the historical condition, the ECUs 106 may trigger the testing operation of the tires T1-T4 as described above. For instance, the ECUs 106 may trigger the testing operation every month, if the tires T1-T4 are new. On the other hand, the ECUs 106 may trigger the testing operation every week, if the tires T1-T4 are old.

In one or more additional aspects, the vehicle operator 124 may send a request to the ECUs 106 (via the vehicle infotainment system 138 or the mobile device 122) to perform the testing. For instance, the vehicle operator 124 may initiate the testing of the tires T1-T4, when the vehicle operator 124 feels shakiness in the vehicle 200 or when the driving experience is not optimal.

In addition, the ECUs 106 may initiate the automatic testing of the tires T1-T4 at a particular time of a day. In particular, the memory 136 may store daily routine of the vehicle operator 124 and other passengers of the vehicle 200, which may be received from the vehicle operator 124 via the mobile device 122 or the vehicle infotainment system 138. The one or more processors 134 may fetch the stored daily routine from the memory 136 and transmit it to the ECUs 106. In some aspects, the ECUs 106 may use the daily routine information and determine a specific time of the day to trigger the automatic testing (as described above) of the tires T1-T4 in such a manner that the time of the testing operation does not coincide with the travel time of the vehicle operator 124

Figure 4:
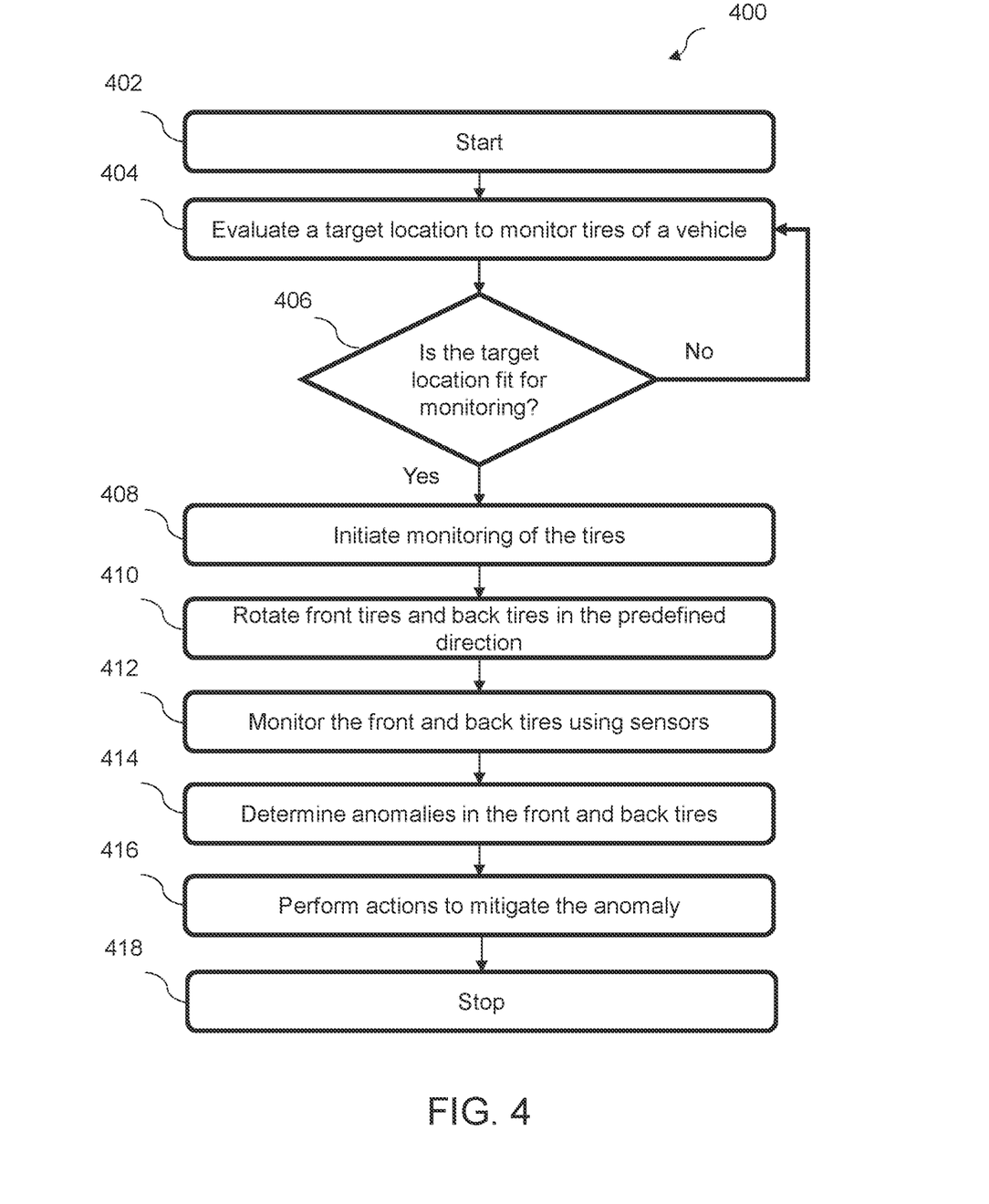
FIG. 4 depicts a flow diagram of an example method for monitoring condition of the tires, in accordance with the present disclosure.

FIG. 4 depicts a flow diagram of an example method 500 for monitoring condition of the tires by the ECUs 106, in accordance with the present disclosure. FIG. 4 may be described with continued reference to prior figures. The following process is exemplary and not confined to the steps described hereafter. Moreover, alternative embodiments may include more or less steps that are shown or described herein and may include these steps in a different order than the order described in the following example embodiments.

Referring to FIG. 4, at step 402, the method 400 may commence. At step 404, the method 400 may include evaluating a target location to monitor the condition of the vehicle tires T1-T4. As discussed above, the ECUs 106 may first analyze or evaluate the target location to test the condition of the tires T1-T4 by using vehicle sensors and cameras. For instance, the ECUs 106 may evaluate the surface of the road on which the vehicle 200 is parked, surrounding of the vehicle 200, and the like.

Based on the evaluation, at step 406, the method 400 may include determining whether the target location is acceptable for monitoring the condition of the vehicle tires T1-T4. If the ECUs 106 determine that the surface on which the vehicle 200 is parked is not flat, or is not smooth, or is parked in a crowded space, then the method 400 moves back to the step 404 to evaluate a new target location (e.g., when the vehicle operator 124 moves the vehicle 200). In other words, the ECUs 106 may disable the monitoring mode of the vehicle 200 if the surface/surrounding in which the vehicle 200 is parked if not fit to perform the monitoring. On the other hand, if the ECUs 106 determine that the surface/surrounding in which the vehicle 200 is parked is fit to perform the monitoring, the ECUs 106 may initiate the monitoring mode/monitoring process to monitor the condition of the tires T1-T4, at step 408.

At step 410, the ECUs 106 may rotate the tires T1-T4 at the predetermined speed and direction to monitor the condition of the tires T1-T4, by using the independent motors M1-M4 as discussed above. In particular, the ECUs 106 rotate the tires T1-T4 in such a manner that the vehicle 200 remains stationary.

During the rotation of the tires T1-T4, the method 400 may include monitoring the condition of the tires T1-T4, at step 412. In particular, the method 400 may include monitoring signals from the one or more vehicle sensors to determine anomalies in the tires T1-T4, at step 414, as described above.

At step 416, the method 400 may include performing one or more remedial actions to mitigate the anomalies, based on the determination of the anomalies in the tires T1-T4. For instance, the one or more actions may include displaying the evaluation of the tires T1-T4 on the vehicle infotainment system 138 or the mobile device 122. In addition, the ECUs 106 may provide recommendation to reduce weight or reduce speed of the vehicle 200, based on the evaluation of the condition of the tires T1-T4. Furthermore, the one or more actions may include cleaning the tires T1-T4 by using the on-board compressor. The method 400 ends at step 418.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation. All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method to monitor tires of a vehicle, the method comprising:
   receive user input to enter a monitoring mode for evaluating the tires;
   determine, via an electronic control unit, the vehicle is at a location acceptable for performing the evaluation of the tires in the monitoring mode;
   rotating front tires of the vehicle in a first direction using one or more first motors;
   rotating back tires of the vehicle in a second direction using one or more second motors, wherein the second direction is opposite to the first direction;
   monitoring, via the electronic control unit, the front tires and the back tires using one or more first sensors, during the rotation of the front tires and the back tires;
   determining, via the electronic control unit, an anomaly in a first tire of the tires based on the monitoring; and
   performing, via the electronic control unit, a remedial action to mitigate the anomaly in the first tire.

2. The method of claim 1, wherein the front tires comprise a front left tire and a front right tire, and wherein the one or more first motors comprise a third motor for the front left tire and a fourth motor for the front right tire.

3. The method of claim 1, wherein the back tires comprise a back left tire and a back right tire, and wherein the one or more second motors comprise a fifth motor for the back left tire and a sixth motor for the back right tire.

4. The method of claim 1, wherein rotating the front tires and the back tires comprises rotating the front tires and the back tires at same speed, and wherein the speed of the rotation is set by the electronic control unit.

5. The method of claim 1, wherein the front tires and the back tires are non-pneumatic tires.

6. The method of claim 1, wherein the one or more first sensors comprise one or more of an anti-lock braking system (ABS) sensor, an inertial sensor, a vibration sensor, a microphone, or a camera.

7. The method of claim 1 further comprising:
   determining, a mode of occupancy in the vehicle using one or more second sensors; and
   based on a determination that the vehicle is in a non-occupant mode, initiating the monitoring mode.

8. The method of claim 1, wherein performing the remedial action comprises:
   detecting, via the electronic control unit, a contaminant in or on the first tire; and
   displaying, via the electronic control unit, a location and a type of the contaminant on a user interface associated with an operator of the vehicle.

9. The method of claim 1, wherein performing the remedial action comprises recommending, based on the determination of the anomaly, one or more of: reduction of speed of the vehicle, reduction of weight in the vehicle, or travel route and time.

10. The method of claim 1, wherein performing the remedial action comprises:
    detecting contaminant in the first tire;
    cleaning, via on-board air compressor, the contaminant in or on the first tire, wherein the cleaning comprises an application of pressurized air on the first tire based on the detection of the contaminant in the first tire, and wherein the application of the pressurized air is based on a type and a size of the contaminant;
    detecting, via a detection unit, whether the contaminant is removed; and
    re-cleaning, via the on-board air compressor, based on a detection that the contaminant is not removed.

11. A vehicle comprising:
    a plurality of motors comprising one or more first motors and one or more second motors, wherein the one or more first motors are configured to rotate front tires of the vehicle in a first direction, and wherein the one or more second motors are configured to rotate back tires of the vehicle in a second direction;
    one or more first sensors configured to monitor condition of the front tires and the back tires; and
    an electronic control unit (ECU) coupled to the plurality of motors and the one or more first sensors, wherein the ECU is configured to:
    evaluate a target location to monitor the front tires and the back tires;
    initiate a monitoring mode of the vehicle to monitor the front tires and the back tires based on the evaluation;
    cause to rotate the front tires in the first direction using the one or more first motors;
    cause to rotate the back tires in the second direction using the one or more second motors, wherein the second direction is opposite to the first direction;
    monitor the front tires and the back tires using the one or more first sensors, during the rotation of the front tires and the back tires;
    determine one or more anomalies in the front tires and the back tires based on the monitoring; and
    based on the determination of a first anomaly of the one or more anomalies, perform one or more remedial actions to mitigate the first anomaly.

12. The vehicle of claim 11, wherein the front tires comprise a front left tire and a front right tire, and wherein the one or more first motors comprise a third motor for the front left tire and a fourth motor for the front right tire.

13. The vehicle of claim 11, wherein the back tires comprise a back left tire and a back right tire, and wherein the one or more second motors comprise a fifth motor for the back left tire and a sixth motor for the back right tire.

14. The vehicle of claim 11, wherein the front tires and the back tires rotate at a same speed.

15. The vehicle of claim 11, wherein the one or more first sensors comprise at least one of an anti-lock braking system (ABS) sensor, an inertial sensor, a vibration sensor, a microphone, or a camera.

16. The vehicle of claim 11, wherein the vehicle further comprises one or more second sensors, and wherein the electronic control unit is configured to:
    determine, via the one or more second sensors, a mode of occupancy in the vehicle; and
    based on a determination that the vehicle is in a non-occupant mode, initiate the monitoring mode.

17. The vehicle of claim 11, wherein to perform the one or more remedial actions, the electronic control unit is configured to:
  detect a contaminant in a tire, of the front tires and the back tires, as the first anomaly; and
  display a location and a type of the contaminant on a user interface associated with an operator of the vehicle.

18. The vehicle of claim 11, wherein to perform the one or more remedial actions, the electronic control unit is configured to recommend, based on the determination of the first anomaly, one or more of: reduction of speed of the vehicle, reduction of weight in the vehicle, and travel route or time.

19. The vehicle of claim 11, wherein to perform the one or more remedial actions, the electronic control unit is configured to:
  detect a contaminant in or on a tire, of the front tires and the back tires, as the one or more anomalies;
  clean, via on-board air compressor, the contaminant in the tire, wherein the cleaning comprises an application of pressurized air on the tire based on the detection of the contaminant in the tire, and wherein the application of the pressurized air is based on a type and a size of the contaminant; and
  determine, via a detection unit, that the contaminant is removed.

20. A non-transitory computer-readable storage medium, the non-transitory computer-readable storage medium having instructions stored thereupon which, when executed by a processor, cause the processor to:
  initiate a monitoring mode of the vehicle to monitor the tires;
  cause to rotate front tires of the vehicle in a first direction using one or more first motors;
  cause to rotate back tires of the vehicle in a second direction using one or more second motors, wherein the second direction is opposite to the first direction such that the vehicle remains stationary;
  monitor the front tires and the back tires using one or more first sensors, during the rotation of the front tires and the back tires;
  determine one or more anomalies in the front tires and the back tires based on the monitoring; and
  based on the determination, perform one or more remedial actions to mitigate the one or more anomalies in the front tires and the back tires.

* * * * *